United States Patent
Perez

(10) Patent No.: US 10,248,365 B2
(45) Date of Patent: Apr. 2, 2019

(54) METHOD AND SYSTEM OF USING OAUTH2 TO SECURE NEIGHBOR DISCOVERY

(71) Applicant: Konica Minolta Laboratory U.S.A., Inc., San Mateo, CA (US)

(72) Inventor: Maria Perez, Half Moon Bay, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 204 days.

(21) Appl. No.: 15/395,030

(22) Filed: Dec. 30, 2016

(65) Prior Publication Data
US 2018/0189005 A1 Jul. 5, 2018

(51) Int. Cl.
G06F 3/12 (2006.01)
H04L 29/12 (2006.01)
H04L 29/06 (2006.01)
H04N 1/00 (2006.01)

(52) U.S. Cl.
CPC .......... *G06F 3/1222* (2013.01); *G06F 3/1226* (2013.01); *G06F 3/1285* (2013.01); *H04L 63/0846* (2013.01); *H04N 1/00244* (2013.01); *H04N 1/00854* (2013.01); *G06F 3/1236* (2013.01); *G06F 3/1292* (2013.01); *H04L 61/2007* (2013.01); *H04L 61/2092* (2013.01); *H04L 61/6059* (2013.01); *H04N 2201/0094* (2013.01); *H04N 2201/0096* (2013.01)

(58) Field of Classification Search
CPC ............... G06F 3/1222; H04L 61/2007; H04L 61/6059
See application file for complete search history.

(56) References Cited

U.S. PATENT DOCUMENTS

| | | | |
|---|---|---|---|
| 7,155,500 B2 * | 12/2006 | Nikander | H04L 63/0442 709/223 |
| 8,036,182 B2 | 10/2011 | Takeda et al. | |
| 8,139,571 B2 * | 3/2012 | Khalil | H04L 63/061 370/389 |
| 8,437,345 B2 | 5/2013 | Takeda et al. | |

(Continued)

OTHER PUBLICATIONS

Dick Hardt (ed) et al., Request for Commensts (RFC) 6749: The OAuth 2.0 Protocol, Internet Engineering Task Force (IETF), Oct. 2012, pp. 1-75. (Year: 2012).*

(Continued)

*Primary Examiner* — Patrice L Winder
(74) *Attorney, Agent, or Firm* — Buchanan Ingersoll & Rooney PC

(57) ABSTRACT

A method, a computer program product, and a system are disclosed, which use OAuth2 to secure IPv6 Neighbor Discovery. The method including sending a Neighbor Discovery duplicate address detection (DAD) package from a client device on a communication network, the Neighbor Discovery DAD package having an authorization code for an OAuth2 token for access to an IPv6 network; receiving the Neighbor Discovery DAD package with the authorization code on an authorizing device, the authorizing device configured to issue OAuth2 tokens; issuing the OAuth2 token having an expiration to the client device for access to the IPv6 network; and allowing the client device to access the IPv6 network until the expiration of the OAuth2 token.

20 Claims, 3 Drawing Sheets

(56) References Cited

U.S. PATENT DOCUMENTS

| | | | | |
|---|---|---|---|---|
| 8,560,856 | B2* | 10/2013 | Sarikaya | H04L 9/3066 |
| | | | | 713/176 |
| 8,601,271 | B2* | 12/2013 | Perez | G06F 1/3209 |
| | | | | 713/175 |
| 8,825,767 | B2* | 9/2014 | Sivavakeesar | H04L 12/1818 |
| | | | | 709/205 |
| 8,879,099 | B2* | 11/2014 | Mogaki | G06F 21/608 |
| | | | | 358/1.14 |
| 8,880,891 | B2 | 11/2014 | Liu et al. | |
| 9,043,884 | B2* | 5/2015 | Behringer | H04L 63/105 |
| | | | | 726/2 |
| 9,377,971 | B2* | 6/2016 | Poirier | G06F 3/1204 |
| 9,461,875 | B2 | 10/2016 | Groat et al. | |
| 10,048,915 | B2* | 8/2018 | Cho | G06F 3/1275 |
| 2010/0313024 | A1* | 12/2010 | Weniger | H04L 63/0823 |
| | | | | 713/170 |
| 2013/0318570 | A1* | 11/2013 | L | H04L 63/20 |
| | | | | 726/4 |
| 2016/0182757 | A1* | 6/2016 | Yoo | H04N 1/00957 |
| | | | | 358/1.15 |
| 2016/0182762 | A1* | 6/2016 | Eum | H04N 1/4413 |
| | | | | 358/1.14 |

OTHER PUBLICATIONS

M. N. Doja et al., Securing IPv6's Neighborhood Discovery, using Locally Authentication Process, International Journal of Computational Engineering Research (iceronline.com), vol. 2. Issue 5, Sep. 2012, pp. 1234-1242. (Year: 2012).*

Z. Shelby et al., FRC Neighbor Discovery Optimization for IPv6 over Low-Power Wireless Personal Area Networks (6LoWPANS), IETF, 55 pages, Nov. 2012 (Year: 2012).*

J. Richer et al., RFC OAuth 2.0 Dynamic Client Registration Protocol, IETF, 39 pages, Jul. 2015 (Year: 2015).*

* cited by examiner

METHOD AND SYSTEM OF USING OAUTH2 TO SECURE NEIGHBOR DISCOVERY

FIELD OF THE INVENTION

The present invention relates to a method and system of using OAath2 (OAuth 2.0) to secure IPv6 Neighbor Discovery, and more particularly to a software module or software application associated with a client device, which uses OAuth2 to secure IPv6 Neighbor Discovery, for example, for a personal computer, a mobile device, or a personal digital assistant to access an IPv6 network.

BACKGROUND OF THE INVENTION

Networks have enhanced our ability to communicate and access information by allowing one personal computer to communicate over a network (or network connection) with another personal computer and/or other networking devices, using electronic messages. When transferring an electronic message between personal computers or networking devices, the electronic message will often pass through a protocol stack that performs operations on the data within the electronic message (e.g., packetizing, routing, flow control).

The first major version of addressing structure, Internet Protocol Version 4 (IPv4), is still the dominant protocol of the Internet, although the successor, Internet Protocol Version 6 (IPv6) is being deployed actively worldwide. The IPv6 network protocol provides that IPv6 hosts or host devices (for example, image forming apparatuses and other devices) can configure themselves automatically (i.e., stateless address autoconfiguration) when connected to an IPv6 network using ICMPv6 neighbor discovery messages (i.e. Neighbor Discovery Protocol or NOP).

When first connecting to a network, an IPv6 host (or node) sends a link-local multicast neighbor solicitation request advertising its tentative link-local address for double address detection (dad), and if no problem is encountered, the host uses the link-local address. The router solicitations are sent (or router advertisements are received depending on timing) to obtain network-layer configuration parameters, and routers respond to such, a request with a router advertisement packet that contains network-layer configuration parameters.

OAuth2 (or OAuth 2.0) is an authorization framework that enables applications to obtain limited access to user accounts on an HTTP service. OAuth2 delegates user authentication to a service that hosts the user account, and authorizes third-party applications to access the user account. OAuth2 provides authorization flows for web and desktop applications, and mobile devices.

SUMMARY OF THE INVENTION

With the implementation of IPv6 networks, it would be desirable to have a software module or software application associated with a client device, such as a personal computer, a mobile device, or a personal digital assistant, which uses Oauth2 to secure IPv6 Neighbor Discovery, for example, for mobile devices to access an Wye network, or a personal computer accessing resources within an office or building for a defined period of time via the IPv6 network.

A method is disclosed of using OAuth2 to secure IPv6 Neighbor Discovery, the method comprising: sending a Neighbor Discovery duplicate address detection (DAD) package from a client device on a communication network, the Neighbor Discovery DAD package having an authorization code for an OAuth2 token for access to an IPv6 network; receiving the Neighbor Discovery DAD package with the authorization code on an authorizing device, the authorizing device configured to issue OAuth2 tokens; issuing the OAuth2 token having an expiration to the client device for access to the IPv6 network; and allowing the client device to access the IPv6 network until the expiration of the OAuth2 token.

A computer program product comprising a non-transitory computer usable medium having a computer readable code embodied therein is disclosed, which uses OAuth2 to secure IPv6 Neighbor Discovery, the process comprising: sending a Neighbor Discovery duplicate address detection (DAD) package from a client device on a communication network, the Neighbor Discovery DAD package having an authorization code for an OAuth2 token for access to an IPv6 network; receiving the Neighbor Discovery DAD package with the authorization code on an authorizing device, the authorizing device configured to issue OAuth2 tokens; issuing the OAuth2 token having an expiration to the client device for access to the IPv6 network; and allowing the client device to access the IPv6 network until the expiration of the OAuth2 token.

A system is disclosed, which uses OAuth2 to secure IPv6 Neighbor Discovery, the system comprising: a client device configured to: send a Neighbor Discovery duplicate address detection (DAD) package on a communication network, the Neighbor Discovery DAD package having an authorization code for an OAuth2 token for access to an IPv6 network; and an authorizing device configured to: receive the Neighbor Discovery DAD package with the authorization code; issue the OAuth2 token having an expiration to the client device for access to the IPv6 network until the expiration of the OAuth2 token.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
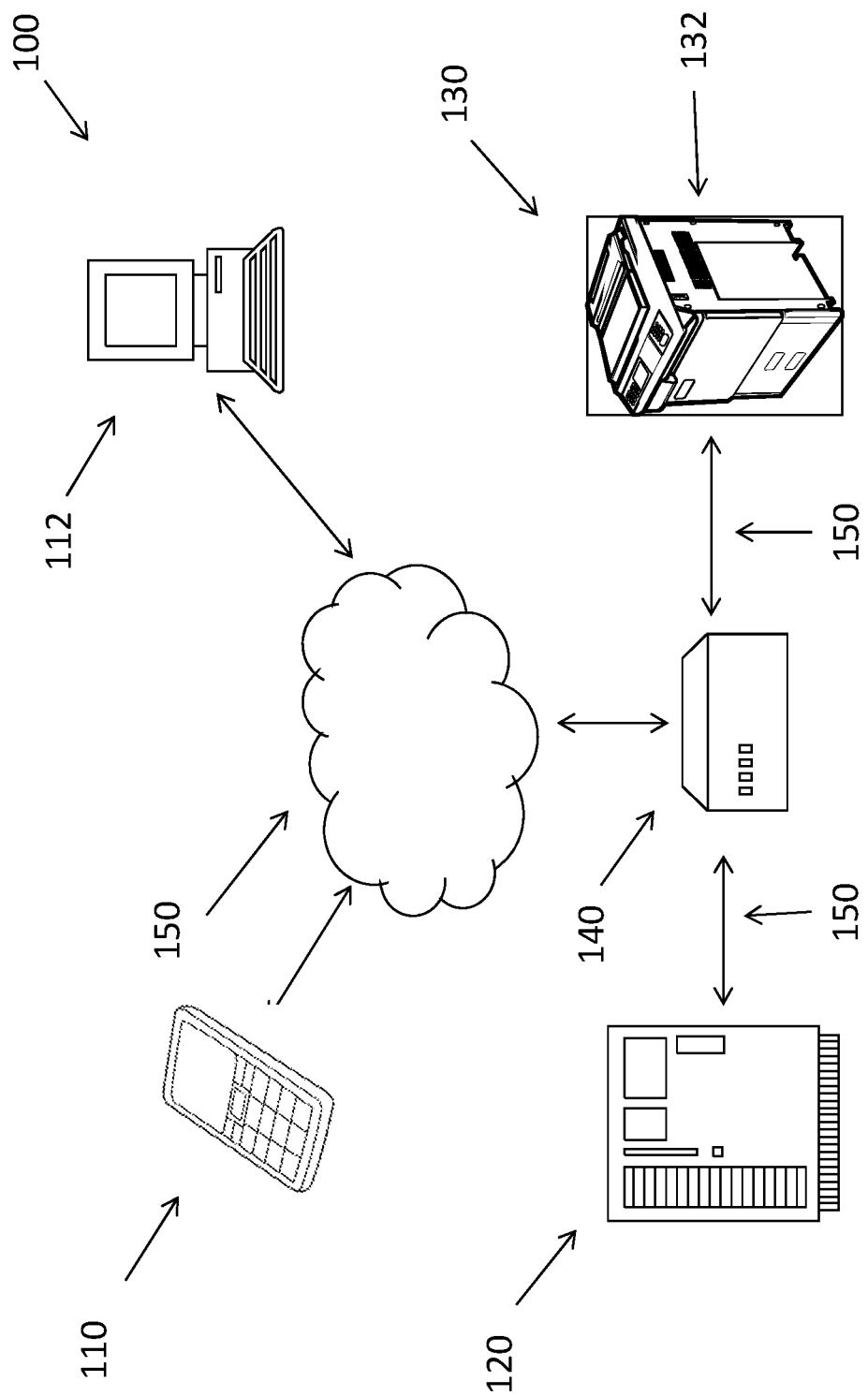
FIG. 1 is an illustration of a network system with a network communication protocol in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a method and system is disclosed of using OAuth2 to secure IPv6 Neighbor Discovery, and more particularly to a software module or software application associated with a client device, such as a personal computer, a mobile device, or a personal digital assistant, which uses OAuth2 to secure IPv6 Neighbor Discovery, for example, for mobile devices to access an IPv6 network. For example, just as a user is able to provide access to a third party by initializing an OAuth2 session to obtain a token, the token obtained can be used to authorize neighbor discovery of a client device (or node), thus allowing the client device (or node) to use IPv6 network resources.

FIG. 1 is an illustration of a network 100 in which a method and system for using OAuth2 to secure neighbor discovery, which can be implemented in accordance with an exemplary embodiment. The network 100 can include, for example, one or more client devices 110, 112, at least one server 120, at least one host device 130, for example, in the form of a printer or a multifunction printer device (MFP) 132, one or more network switches or routers 140 and a network connection 150. Each of the one or more client devices 110, 112, the at least one server 120, the at least one host device 130, for example, the printer or multifunction printer device (MFP) 132 and one or more network switches or routers 140 can be considered to be a node, a connection point, a redistribution point, or communication end point, and are devices, which support an IPv6 communication protocol (Internet Protocol version 6).

In accordance with an exemplary embodiment, each of the one or more client devices 110, 112 can include a processor or central processing unit (CPU), and, one or more memories for storing software programs and data (such as files to be printed). The processor or CPU carries out the instructions of a computer program, which operates and/or controls at least a portion of the functionality of the client devices 110, 112. Each of the client devices 110, 112, can also include an operating system (OS), which manages the computer hardware and provides common services for efficient execution of various software programs. For example, the software programs can include application software and printer driver software. Examples of client devices 110, 112 can include and are not limited to personal computers, personal digital assistants (PDAs), and mobile devices.

In accordance with an exemplary embodiment, the at least one server 120 can include a processor or central processing unit (CPU), and one or more memories for storing software programs and data. The processor or CPU carries out the instructions of a computer program, which operates and/or controls at least a portion of the functionality of the at least one server 120. The server 120 can also include an operating system (OS), which manages the computer hardware and provides common services for efficient execution of various software programs. For example, in accordance with an exemplary embodiment, the at least one server 120 can be a server, which hosts or handles distribution of tokens in accordance with the OAuth2 open standard.

In accordance with an exemplary embodiment, the at least one host device 130 can be a multi-function peripheral (MFP) or printer 132, which can be connected to the one or more client devices 110, 112 via the communications network 150. In accordance with an exemplary embodiment, the multi-function peripheral (MFP) 132 can include at least a copy function, an image reading function, a facsimile (fax) function, and a printer function, and forms an image on a sheet based on a print job (print instruction) received, from the one or more client devices 110, 112 from, for example, a client device 110, 112 in the form of, a personal computer, a mobile device, or a personal digital assistant.

In accordance with an exemplary embodiment, the one or more client devices 110, 112 can be configured to submit print jobs to the at least one multifunction printers or printers 132 by transmitting data representing the documents to be printed and information describing the print job. The at least one multifunction printer or printer 132 can include a printer controller (or firmware), a memory section preferably in the form of a hard disk drive (HDD), an image processing section (or data dispatcher), a print engine, and an input/output (I/O) section.

In accordance with an exemplary embodiment, the one or more network switches or routers 140 can include, for example, an Ethernet switch, for example, an Ethernet switch having Link Layer Discovery Protocol LLDP), a gateway, a router, and the like.

In accordance with an exemplary embodiment, the one or more clients 110, 112, the at least one server 120, the at least one host device 130, for example, in the form of a printer 130, the one or more data switches or routers 140 are preferably connected via the Internet or communication network (or network) 150. The communication network 150 may include, for example, a conventional type network, wired or wireless, and may have any number of configurations, such as a star configuration, token ring configuration, or other known configurations. The communication network 150 may include one or more local area networks ("LANs"), wide area networks ("WANs") (e.g., the Internet), virtual private networks ("VPNs"), peer-to-peer networks, near-field networks (e.g., Bluetooth®), cellular networks (for example, 3G, 4G, other generations), and/or any other interconnected data path across which multiple computing nodes may communicate.

In accordance, with an exemplary embodiment, data may be transmitted in encrypted or unencrypted form between the nodes of the communication network (or network) 150 using a variety of different communication protocols including, for example, various Internet layer, transport layer, or application layer protocols. For example, data may be transmitted via the networks 150 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), file transfer protocol (FTP), WebSocket (WS), wireless access protocol (WAP), various messaging protocols (SMS, MMS, XMS, NAP, SMTP, POP, WebDAV, etc.), or other known protocols.

In the IPv6 protocol, the generation of an IP address (or IPv6 address) for an image forming device or other apparatus/device is defined in RFC 2462, entitled "IPv6 Stateless Address Autoconfiguration." The IPv6 stateless autoconfiguration utilizes several features in IPv6, including link-local addresses, multicasting, the Neighbor Discovery (ND) protocol, and the ability to generate the interface identifier of an address from an underlying data link layer address (or MAC ID). The IPv6 protocol, provides a computer device or image forming apparatus the ability to generate a temporary address until it can determine the characteristics of the network, and then create a permanent address it can use based on that information.

The steps a server 120, a host device 130 or a printer 132, or a router 140 takes when using stateless autoconfiguration is configured to generate a link-local address, which is one of the two types of local-use IPv6 addresses. The link-local addresses has "1111 1110 10" for the first ten bits. The generated address uses those ten bits followed by 54 zeroes and then the 64-bit interface identifier, for example, which can be derived from the data link layer (MAC) address.

A Link-Local Address Uniqueness Test (or Double address detection (DAD)) can be used to test and to ensure that the address it generated is not for some reason already in use on the local network. The device or apparatus sends a Neighbor Solicitation message using the Neighbor Discovery (ND) protocol, and listens for a Neighbor Advertisement in response that indicates that another device is already using its link-local address, and if so, either a new address must be generated, or autoconfiguration fails and another method must be employed.

Assuming the uniqueness test passes, the server 120, the host device 130 or printer 132, or the router 140 assigns the link-local address (i.e., Link-Local Address Assignment) to its IP interface. This address can be used for communication on the local network, however, it cannot be used on the wider Internet (or communication network), since link-local addresses are not routed.

The node next attempts to contact a local router for more information on continuing the configuration. This can be done either by listening for Router Advertisement messages sent periodically by routers, or by sending a specific Router Solicitation to ask a router for information on what to do next. The router also provides direction to the node on how to proceed with the autoconfiguration. The router can tell the node that on this network "stateful" autoconfiguration is in use, and tell it the address of a DHCP server to use. Alternately, the router will tell the host how to determine its global Internet address.

Assuming that stateless autoconfiguration is in use on the network, the host will configure itself with its globally-unique Internet address. It can be appreciated that this globally-unique address is generally formed from a network prefix provided to the host by the router, combined with the device's identifier as generated in the first step. In addition, when using the protocol stateless addressing (stateless autoconfiguration) for IPv6, which is required by the IPv6 Ready Logo Program, the link-local addresses and global addresses are determined by concatenating an identifier unique to the adapter, Thus, when a MAC address broadcast is sent out, each network interface card on the local area network will see the broadcast address and automatically pass the information up to the upper layers of the OSI model (Open Systems Interconnection model).

Since the discovery protocol for IPv6 is Neighbor Discovery requires certificate handling, certificate processing can involve a great amount of resource usage and infrastructure. In addition, it is not as flexible, for example, as a Mobile IPv6 node would require. For example, when a mobile device moves from one network to a different network under the Mobile IP protocol, the certification path has to be established. In addition, the mobile device must obtain the certificates, coordinate with routers and may leave or be forced from the network, even though the mobile device has (or contains) all of the information needed to join the network as a valid note, unless the certificate revocation list is updated immediately.

OAuth2, however, is designed to provide flexible credentials via tokens. For example, if, a device 110, 112 leaves a network, the token will expire, however, since it is not difficult to acquire another token, the device 110, 112 can quickly rejoin the network and the departure of the device 110, 112 from the network may be for just a brief period of time or duration of time.

Accordingly, it would be disable to use Ouath2 to secure IPv6 Neighbor Discovery, and more particularly to a software module or software application 210 associated with a host or client device 110, 112, such as a personal computer, a mobile device, a personal digital assistant, which uses Oauth2 to secure IPv6 Neighbor Discovery, for example, for mobile devices to access an IPv6 network.

In addition, the usage of tokens can be more flexible than certificates, because the OAuth2 protocol is designed with the consensus that a token life time can be brief, for example, the token can be valid, for example, for a duration of approximately 5 minutes, or longer. In addition, the tokens can be renovated (or restored) easily if necessary, which can, make the use of tokens to authenticate and secure IPv6 Neighbor Discovery desirable.

In accordance with an exemplary embodiment, a method and system are disclosed, which uses OAuth2 to allow IPv6 neighbor solicitation. For example, in accordance with an exemplary embodiment, a network with a server 120 that is allowed and validated in the local network. A device 110, 112, for example, a mobile device, needs to use the network, the user of the device can authorize the device, for example, for a predetermined time period, for example for only 10 minutes. The client device 110, 112, can initialize using IPv4 and obtains an authorization code or access code that it uses to obtain, an OAuth2 token to secure IPv6 Neighbor Discovery.

In accordance with an exemplary embodiment, the client device 110 112, can obtain the authorization code or access code, for example, by inputting an authentication code, which authenticates a user, for example, username and password into a user-agent (for example, a web browser), which user authorization request is then sent, for example, over an IPv4 network to the server 120, the at least one host device 130, or the router 140, which hosts the OAuth2 tokens for the local network. If the device 110, 112, is granted authorization, for example, an authorized username and password has been entered, the authorization server (or resource owner), for example, which can be the server 120, the at least one host device 130, or the printer 132, sends an authorization code or access code to the client device 110, 112. The client device 110, 112 in return sends the authorization code or the access code to the authorization server 120, 130, 132, with a request for an OAuth2 token. The authorization server 120, 130, 132 in response to the request for the OAuth2 token forwards the OAuth2 token to the client device 110, 112. In accordance with an exemplary embodiment, the distribution of the OAuth2 tokens is preferably handled by the server 120. However, as set forth above, the distribution of the OAuth2 tokens can also be distributed by, for example, the router 120, the at least one host device 130, or the printer 132.

In accordance with an exemplary embodiment, after obtaining the access token OAuth2 token) for security purposes, the client device 110, 112 may become an IPv6 only device and uses this token in the Neighbor Discovery options to start IPv6 address state or stateless configuration and Neighbor Discovery with, for example, the router 140. In accordance with an exemplary embodiment, the router 140 receives a request from the client device 110, 112 to join the network in the form of an ICMPv6 packet with the OAuth2 token, in accordance with an exemplary embodiment, after, for example, a predetermined time period, for example, 5 or 10 minutes having elapsed, the 5 or 10 minutes being the duration or time period of the OAuth2 token, the router 140 on the network 150 will not respond to any Neighbor Discovery messages from the client device 110, 112. Thus, denying the client device 110, 112 access to communication on the link and/or use of the IPv6 network resources until a new OAuth2 token is obtained, for example, from the server 120.

In accordance with an exemplary embodiment, although, the previous example uses IPv4 to obtain the OAuth2 token, other methods could be used for example, in accordance with an exemplary embodiment, the usage of IPv6 header extension options where the extension option sends the authorization code and the server or the authorization server 120 on the link responds with the access code and the IPv6 Destination Options header extension providing the token (OAuth2 token) to be used with neighbor solicitation options. If the token is not provided by, for example, the server 120, the new device, for example, the client device 110, 112, is not allowed in the IPv6 network.

Figure 2:
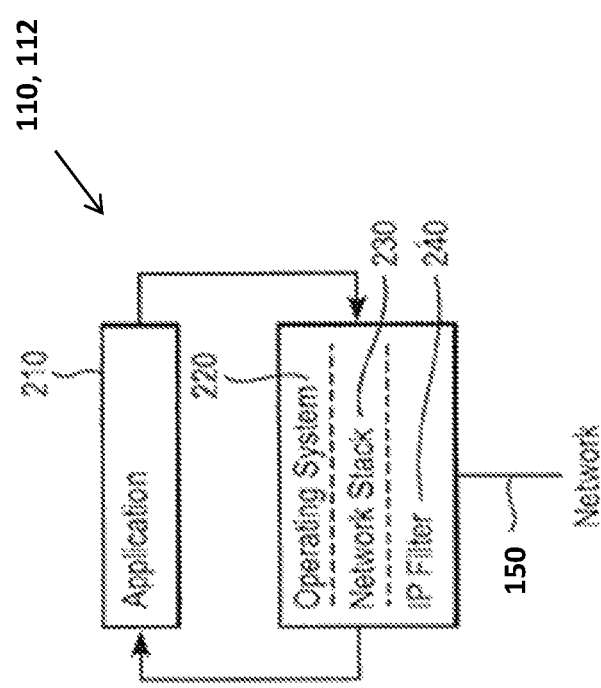
FIG. 2 is an illustration of a network stack for a client device having an application, which uses OAuth2 to secure neighbor discovery in accordance with an exemplary embodiment.

FIG. 2 is an illustration of a network stack for a client device 110, 112, having an application 210 for filtering data packets in accordance with an exemplary embodiment. As shown in FIG. 2, the client device 110, 112, has a software module (or application) 210 and an IP filter (or packet capture filter) 240, which uses OAuth2 to secure IPv6 Neighbor Discovery in accordance with an exemplary embodiment as disclosed herein. As shown in FIG. 2, the software module 210 is preferably an application level module, which is configured to modify, drop, change, and judge Neighbor Discovery generated packages Neighbor Discovery solicitation or Neighbor Discovery advertisement packets) as described herein, in accordance with an exemplary embodiment, the software module 210 can be part of the printer driver and/or firmware of a client device 110, 112, a separate software module or application, or part to the operating system of the client device 110, 112.

In accordance with an exemplary embodiment, the IP filter 240 forwards the incoming or outgoing packet having a Neighbor Discovery solicitation or Neighbor Discovery advertisement packet (or package) to the software module 210, which in combination with the socket layer modifies, changes, drops and/or judges the Neighbor Discovery generated packages as described herein. Each of the client devices 110, 112, preferably includes a software module (or application) 210, which can perform at least a portion and/or more preferably all of the steps necessary to use OAuth2 to secure IPv6 Neighbor Discovery as described herein.

The packets (or packages) are preferably broadcast and/or sent out via a communication network, for example, an IPv6 network 150. In accordance with an exemplary embodiment, the IP filter 240 preferably captures the IPv6 packet before the initial broadcast (i.e., Neighbor Discovery) and/or alternatively, before the packet is sent to the Network Stack 230 for processing. In accordance with an exemplary embodiment, the software module's 210 functionality also can be enabled or disabled at will by a network administrator or other designated individual.

The client device 110, 112 can include an operating system 220 (OS), which acts as an interface between the device's hardware and application programs, and which is also responsible for the management and coordination of activities and the sharing of the resources within host devices. In accordance with an exemplary embodiment, the software module 210 runs on the operating system 220 of the client device 110, 112 and the network layer is under or a part of the operating system 220. It can be appreciated that by utilizing a software module 210 as described herein, the operating system of the host device 200 does not need to be altered or changed in anyway.

Alternatively, it can be appreciated that in accordance with another exemplary embodiment, the operating system (OS) 220 can be configured to perform the methods as described herein. The examples as set forth herein are exemplary only, and additional uses of OAuth2 to secure INC Neighbor Discovery can be implemented without departing from the present disclosure.

Figure 3:
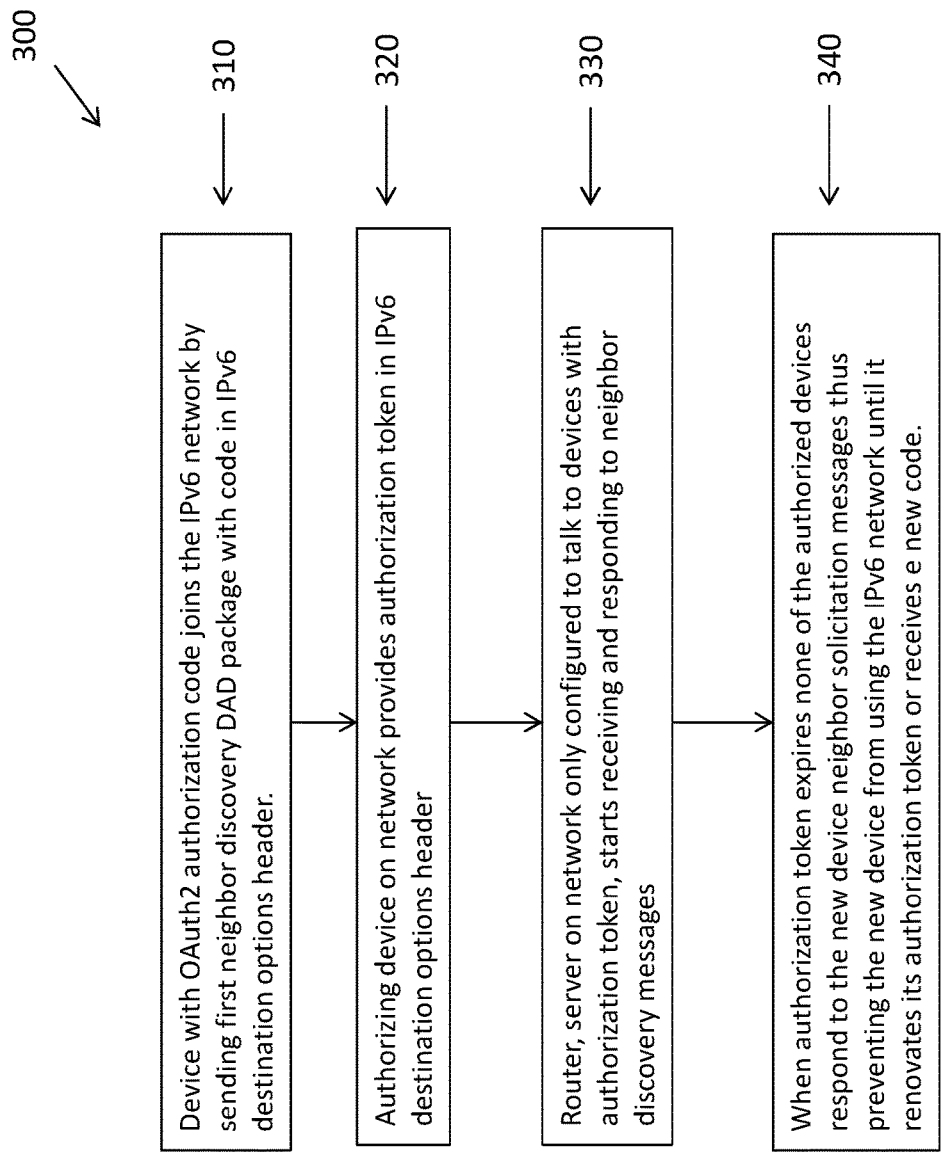
FIG. 3 is a flow chart illustrating a client device having a software module or software application, which uses OAuth2 to secure Neighbor Discovery in accordance with an exemplary embodiment.

FIG. 3 is a flow chart 300 illustrating a client device 110, 112 having a software module or software application, which uses OAuth2 to secure Neighbor Discovery in accordance with an exemplary embodiment. As shown in FIG. 3, in step 310, a client device 110, 112, for example, a personal computer or mobile device 110, 112 having obtained an OAuth2 authorization code can join the IPv6 network by first sending a neighbor discovery DAD package with the authorization code in the IPv6 Destination Options header extension. For example, in accordance with an exemplary embodiment, the authorization code can be received via an authentication protocol, for example, a username and a password, which can authorize the receipt of the authorization code from the authentication server, for example, the server 120.

In step 320, an authorizing device on the IPv6 network, for example, the server 120 provides the client device, 110, 112, with an authorization token (OAuth2 token) in the IPv6 Destination Options header extension. In step 330, for example, the server 120, the at least one host device 130, the printer 132, or the router 140 on the IPv6 network, which can be configured to talk to only devices with authorization tokens (OAuth2), begin receiving and responding to Neighbor Discovery messages from the client device 110, 112. In step 340, when the authorization token (OAuth2) expires, each of the authorized devices, for example, the server 120, the at least one host device 130, the printer 132, or the router 140, respond to new device neighbor solicitation messages, thus preventing the client device 110, 112 from using the IPv6 network until it renovates (or receives) a new authorization token or receives a new code.

In accordance with an exemplary embodiment, a computer program product comprising a non-transitory computer usable medium having a computer readable code embodied therein is disclosed, which uses OAuth2 to secure IPv6 Neighbor Discovery, the process comprising: sending a Neighbor Discovery duplicate address detection (DAD) package from a client device on a communication network, the Neighbor Discovery DAD package having an authorization code for an OAuth2 token for access to an IPv6 network; receiving the Neighbor Discovery DAD package with the authorization code on an authorizing device, the authorizing device configured to issue OAuth2 tokens; issuing, the OAuth2 token having an expiration to the client device for access to the IPv6 network: and allowing the client device to access the IPv6 network until the expiration of the OAuth2 token.

The non-transitory computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it s intended that the present invention cover modifications and variations of this invention provided they fail within the scope of the following claims and their equivalents.

What is claimed is:

1. A method of using OAuth2 to secure IPv6 Neighbor Discovery, the method comprising:
    sending a Neighbor Discovery duplicate address detection (DAD) package from a client device on a communication network, the Neighbor Discovery DAD package having an authorization code for an OAuth2 token for access to an IPv6 network;
    receiving the Neighbor Discovery DAD package with the authorization code on an authorizing device, the authorizing device configured to issue OAuth2 tokens;
    issuing the OAuth2 token having an expiration to the client device for access to the IPv6 network; and
    allowing the client device to access one or more resources via the IPv6 network until the expiration of the OAuth2 token.

2. The method of claim 1, comprising:
    issuing a new OAuth2 token to the client device upon the expiration of the OAuth2 token.

3. The method of claim 1, comprising:
    initialing accessing the authorizing device over an IPv4 communication network.

4. The method of claim 1, comprising:
    obtaining the authorization code by entry of a username and a password into the client device.

5. The method of claim 1, comprising:
    sending the authorization code in the IPv6 Destination Option header extension of the Neighbor Discovery DAD package.

6. The method of claim 1, wherein the client device is a mobile device, the mobile device communicating with the communication network via Mobile IP protocol.

7. The method of claim 1, wherein the one or more resources is a multi-function peripheral (MFP), and the method further comprising:
    sending a job to be processed by the multi-function peripheral (MFP) from the client device via the IPv6 network, the job being a print job, a scan job, a copy job, or a fax job.

8. The method of claim 7, wherein the job is a print job, the method comprising:
    printing the print job on the MFP.

9. The method of claim 1, comprising:
    setting the expiration of the OAuth2 token for a time period of less than 10 minutes.

10. A computer program product comprising a non-transitory computer usable medium having a computer readable code embodied therein, which uses OAuth2 to secure IPv6 Neighbor Discovery, the process comprising:
    sending a Neighbor Discovery duplicate address detection (DAD) package from a client device on a communication network, the Neighbor Discovery DAD package having an authorization code for an OAuth2 token for access to an IPv6 network;
    receiving the Neighbor Discovery DAD package with the authorization code on an authorizing device, the authorizing device configured to issue OAuth2 tokens;
    issuing the OAuth2 token having an expiration to the client device for access to the IPv6 network; and
    allowing the client device to access one or more resources via the IPv6 network until the expiration of the OAuth2 token.

11. The computer program product of claim 10, comprising:
    issuing a new OAuth2 token to the client device upon the expiration of the OAuth2 token.

12. The computer program product of claim 10, comprising:
    initialing accessing the authorizing device over an IPv4 communication network.

13. The computer program product of claim 10, comprising:
    obtaining the authorization code by entry of a username and a password into the client device.

14. The computer program product of claim 10, comprising:
    sending the authorization code in the IPv6 Destination Option header extension of the Neighbor Discovery DAD package.

15. The computer program product of claim 10, wherein the one or more resources is a multi-function peripheral (MFP), and further comprising:
    sending a job to be processed by the multi-function peripheral (MFP) from the client device via the IPv6 network, the job being a print job, a scan job, a copy job, or a fax job.

16. A system, which uses OAuth2 to secure IPv6 Neighbor Discovery, the system comprising:
    a client device configured to:
        send a Neighbor Discovery duplicate address detection (DAD) package on a communication network, the Neighbor Discovery DAD package having an authorization code for an OAuth2 token for access to an IPv6 network; and
        access one or more resources via the IPv6 network; and
    an authorizing device configured to:
        receive the Neighbor Discovery DAD package with the authorization code;
        issue the OAuth2 token having an expiration to the client device for access to the IPv6 network until the expiration of the OAuth2 token.

17. The system of claim 16, wherein the authorizing device is configured to:
    issue a new OAuth2 token to the client device upon the expiration of the OAuth2 token.

18. The system of claim 16, wherein the client device obtains the authorization code by entry of a username and a password into the client device.

19. The system of claim 16, wherein the client device sends the authorization code in the IPv6 Destination Option header extension of the Neighbor Discovery DAD package.

20. The system of claim 16, wherein the client device is a mobile device, the mobile device communicating with the communication network via Mobile IP protocol, and the one or more resources is a multi-function peripheral (MFP) configured to receive a print iob from the client device via the IPv6 network, the iob being a print iob, a scan iob, a copy iob, or a fax job.

* * * * *